(LIGHT LINES REPRESENT PRIOR ART)

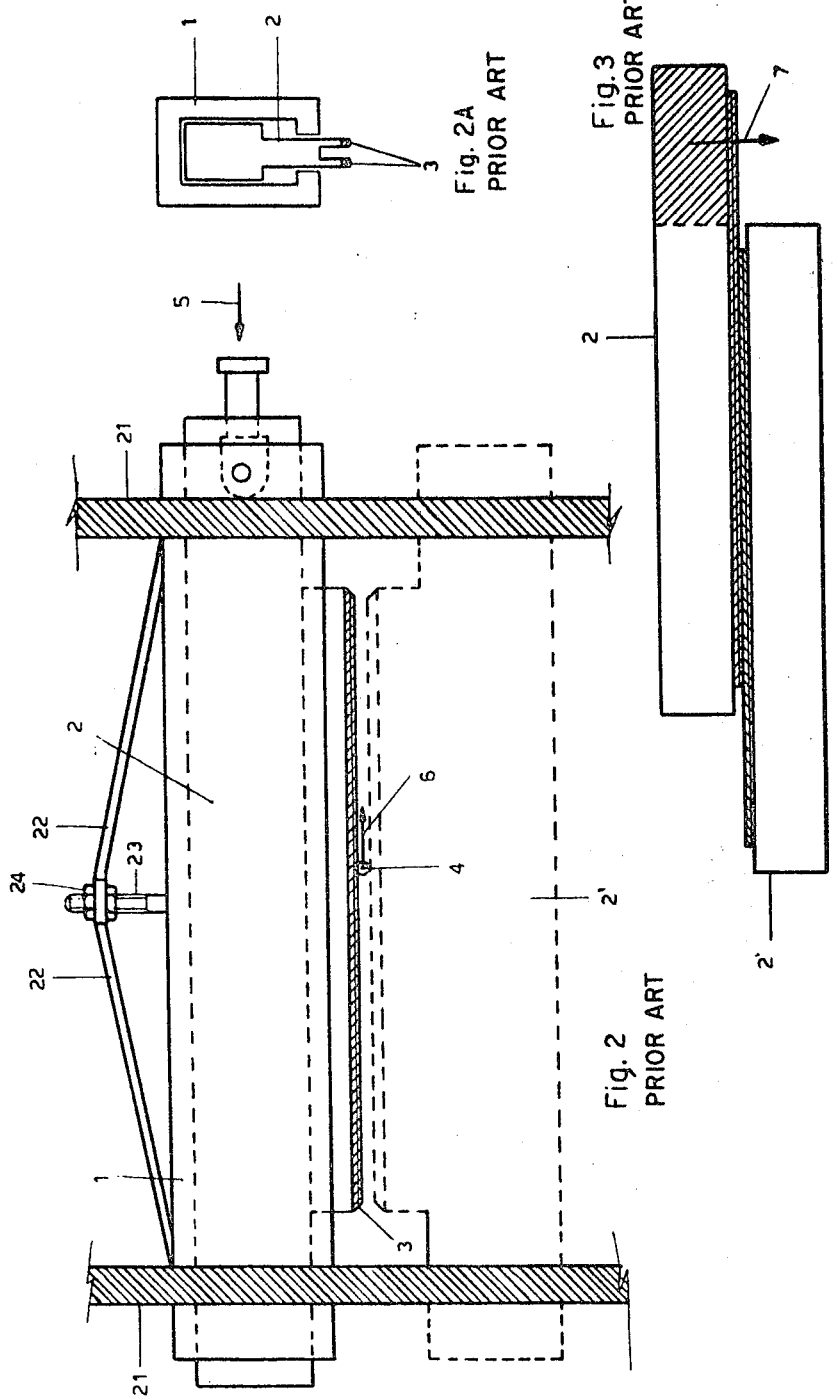

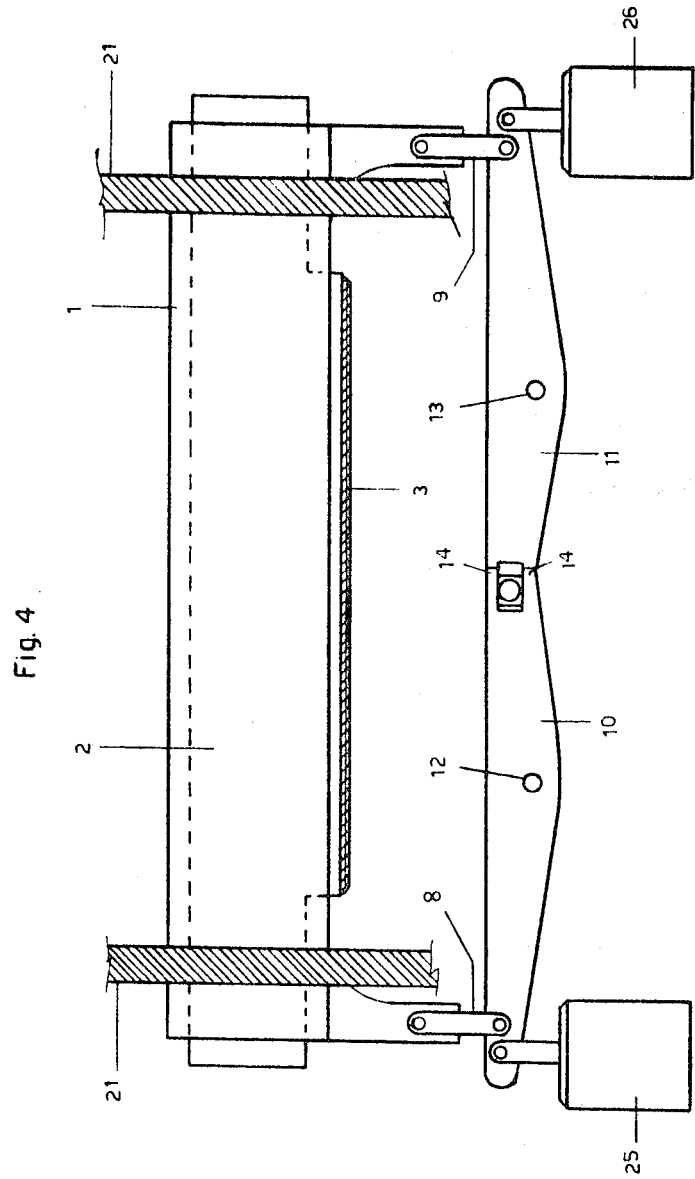

United States Patent Office 3,460,333
Patented Aug. 12, 1969

3,460,333
SYSTEM FOR MAKING UNIFORM THE PRESSURE EXERTED ON THE BEAM RUBBERS OF A FRINGING MACHINE
Giovanni Battista Pozzolo, Via Nazionale, Lovere 2, Italy
Filed May 22, 1967, Ser. No. 640,052
Claims priority, application Italy, July 1, 1966, 12,557/66
Int. Cl. D01h 7/92, 7/46
U.S. Cl. 57—1                                          4 Claims

ABSTRACT OF THE DISCLOSURE

A beam loading and moment compensating construction for a fringe twisting machine in which the upper and lower traverse members, which carry the horizontally slidable upper and lower beams having opposed rubber surfaces, are locked together prior to the horizontal movement of the beams and wherein the upper traverse member is raised and lowered by a pair of piston-cylinder units located at the ends thereof, the piston rods being interconnected by a pair of pivotally mounted levers hinged together at their inner ends.

Background and objects of the invention

The present invention relates generally to fringe twisting machines and relates more particularly to certain new and useful improvements in the provisions and apparatus for the loading of the beam rubbers in such fringe twisting machines so that the beam rubbers exert a uniform fringe-twisting pressure on each of a series of fringes which extend across the width of the cloth carried by the machine.

In the fringe twisting machines as presently known, the warp threads, separated into groups by combs and countercombs, are subsequently rolled into fringes by means of a system of opposed, upper and lower beams which, sliding parallel and in opposite directions, give them a twist. In order that all the fringes present the same degree of twist, it is necessary that there be a uniform distribution of the load or pressure exerted by the beam rubbers on the fringes, so that each fringe is equally rolled.

Heretofore, fringe twisting machines of the foregoing construction have not realized a uniform distribution of the load on the beam rubbers engaging the cloth fringes.

Considering the equilibrium of the upper beam of the present fringe twisting machines, it will be seen that an actuating horizontal force applied to the end of the beam does not lie on the same direction line as that of the reaction force, which is applied to the beam rubber; moreover, the center of gravity of the beam, when said beam is at the end of its horizontal travel, is no longer vertically aligned with the center of gravity of the area of the rubber which is in contact with the fringes.

As the beam weight is considerable, it will be understood from the foregoing that the distribution of the load on the beam rubbers is very irregular, as moments arise which press the rubbers on one side of the beam with greater force than those on the other side. Consequently, since the beams are necessarily loaded so as to exert the minimum load on the fringes having the smallest size, there is an abnormal wear on the beam rubbers.

In view of this irregular loading of the beam rubbers, the fringes are not uniformly rolled and it is therefore necessary for the operator to compensate for these deficiencies by giving to the less loaded fringes a manual twist and this increases the working time and, consequently, the cost of the product.

It is therefore the object of the present invention to eliminate the foregoing disadvantages in fringe twisting machines and to provide new and improved apparatus for increasing the reliability of the rolling work by absorbing the moments applied to the beams of the machine by maintaining the upper beam constantly parallel to itself and transmitting only centered loads to the beam rubbers, thereby resulting in greater uniformity in the rolling of the fringes, a lower wear of the beam rubbers which, consequently, need to be loaded only with the least load necessary for the rolling of the fringes, and the elimination of all manual intervention in the operation of the machine.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

It will be understood that the foregoing general description and the following detailed description as well and exemplary and explanatory of the invention but are not restrictive thereof.

The accompanying drawings, referred to herein and constituting a part hereof, illustrate a preferred embodiment of the invention, and together with the description, serve to explain the principles of the invention.

Brief description of the drawings

Of the drawings:

FIGURE 2 is a fragmentary view in front elevation, partly sectional and partly schematic, illustrating, in presently known fringe twisting machines such as that shown in FIGURE 1, the moment, or force couple, created between the horizontal force applied to the end of the beam and the reaction force applied to the rubber of the beam by the fringes;

FIGURE 2A is a view in end elevation, illustrating the upper beam and traverse guiding body of the construction of FIGURE 2;

FIGURE 3 is a schematic view illustrating the moment, or force couple, produced when the opposed beams of FIGURE 2 are at the end of their horizontal travel;

FIGURE 4 is a fragmentary view in front elevation, partly schematic and partly in section, of the beam loading and moment compensating construction embodying the invention, and shown in dark lines in FIGURE 1.

Description of the preferred embodiment

Figure 1:
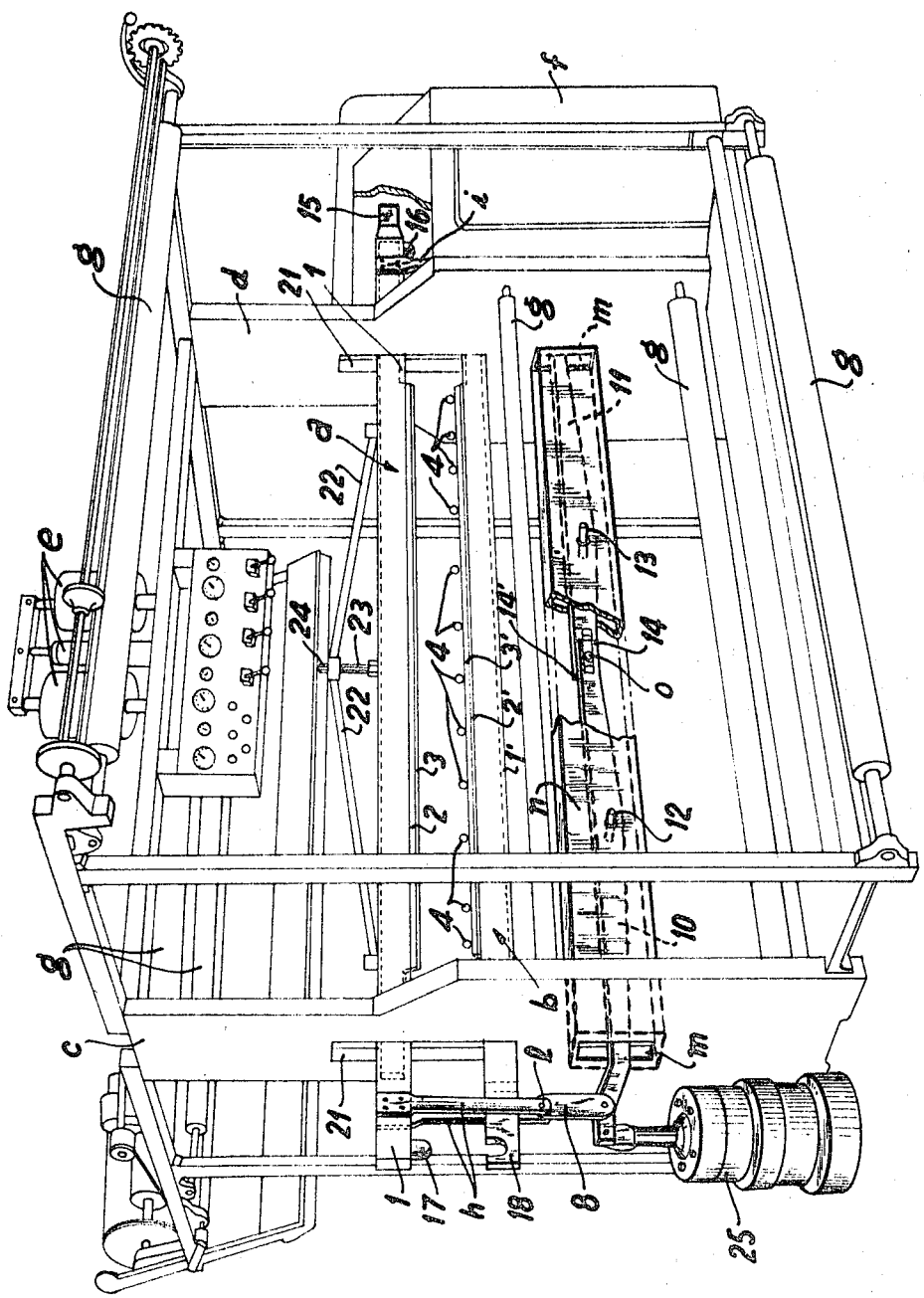
FIGURE 1 is a perspective view, partly schematic, illustrating in light lines, a representative prior are fringe twisting machine and, in dark lines, a new and improved beam loading and moment compensating construction embodying the present invention.

Referring now more particularly to the drawings, there is shown in FIGURE 1 the present construction of fringe twisting machines, wherein there is an upper traverse member *a* and a lower traverse member *b* which twist the fringes 4 by horizontally sliding in opposite directions.

The lower traverse *b* comprises a box-shaped guiding body 1', rigidly connected to the shoulders *c* and *d* of the machine, and a horizontally movable beam 2', sliding inside guide 1' and presenting on the upper side thereof the fringe engaging rubbers 3'.

The upper traverse member *a* comprises, in turn, a box-shaped guiding body 1, inside of which slides the horizontally movable beam 2, presenting on the lower side thereof the fringe engaging rubbers 3.

The guiding body 1, together with the slidable beam 2, may be lifted and lowered by means of the system *e*, sliding in suitable slots 21 formed in the sides *c* and *d* of the machine. Both the beam 2' of the lower traverse 1' and the beam 2 of the upper traverse 1 are then caused to slide horizontally in opposite directions by means of two oil cylinders housed in the case *f*.

The operation of the fringe twisting machine is as follows: When the traverse *a* is raised, the cloth (not shown) on whose overall width a series of fringes 4 must be twisted, is carried by a series of carrier rollers *g* in such a manner that the part to be fringed rests on the rubbers 3' of the lower traverse *b*. The upper traverse *a* is then lowered and rests with its rubber 3 on the series of fringes 4, loading the fringes with its own weight. Thereafter, the beams 2 and 2' are slid horizontally in opposite directions whereby all the fringes of the cloth are twisted at the same time.

It will be apparent from the foregoing that, in order to obtain a uniform distribution of the load exerted by the beam rubbers on the fringes of the whole cloth and, consequently, a uniform and constant twisting of each of the fringes, it is necessary that the beam 2 of the upper traverse *a* maintains rigorous parallelism with the beam 2' of the lower traverse as it slides horizontally thereto, since otherwise a number of the fringes will be loaded with a weight higher than that experienced by the remaining fringes of the series. It will be understood that rigorous horizontal motion of the beam 2' is achieved since guide 1' is rigidly secured to the sides of the machine.

It will also be apparent from the foregoing that in the present construction of fringe twisting machines, there is an irregular distribution of the load exerted by the rubbers 3 of the upper traverse *a* on the fringes 4. Thus, as best seen in FIGURES 2–2A, the horizontal force 5 acting on the beam 2 of the upper traverse *a* is not coaxial with the reaction force 6 exerted by the fringes on the rubbers 3. There is therefore produced a force couple, or moment, whose value is equal to the product of the magnitude of one of the forces by the distance between their action lines, which causes an inclination in the upper traverse *a* and, consequently, an irregular load on the fringes 4.

A further cause for an irregular distribution of the load on the fringes is due to the fact that the movable beams 2 and 2' of the two traverse members *a* and *b* slide in opposite directions. Thus, at the end of this sliding stroke, the beams are in the position shown in FIGURE 3, whereat the beam 2 of the upper traverse *a* protrudes from the beam 2' of the lower traverse *b* as indicated by the dashed line of FIGURE 3. The weight of this protruding part of the beam 2 is therefore an overhanging load 7, producing a moment with respect to the center of gravity of the beam 2, tending to rotate the beam 2 clockwise and, consequently, the upper traverse member *a*. It will be understood that this rotation causes a higher compression of the fringes, inserted between the rubbers 3 and 3', which are situated on the side nearest the overhanging load 7, and, consequently, causes the fringes to be twisted non-uniformly.

In accordance with the invention, there is provided a beam loading and moment compensating construction for a fringe twisting machine which eliminates the irrgular distribution of the load exerted by the beam rubbers on the fringes of the cloth carried by the machine and, consequently, exerts a uniform fringe-twisting pressure across the entire width of the cloth carried by the machine.

Figure 5:
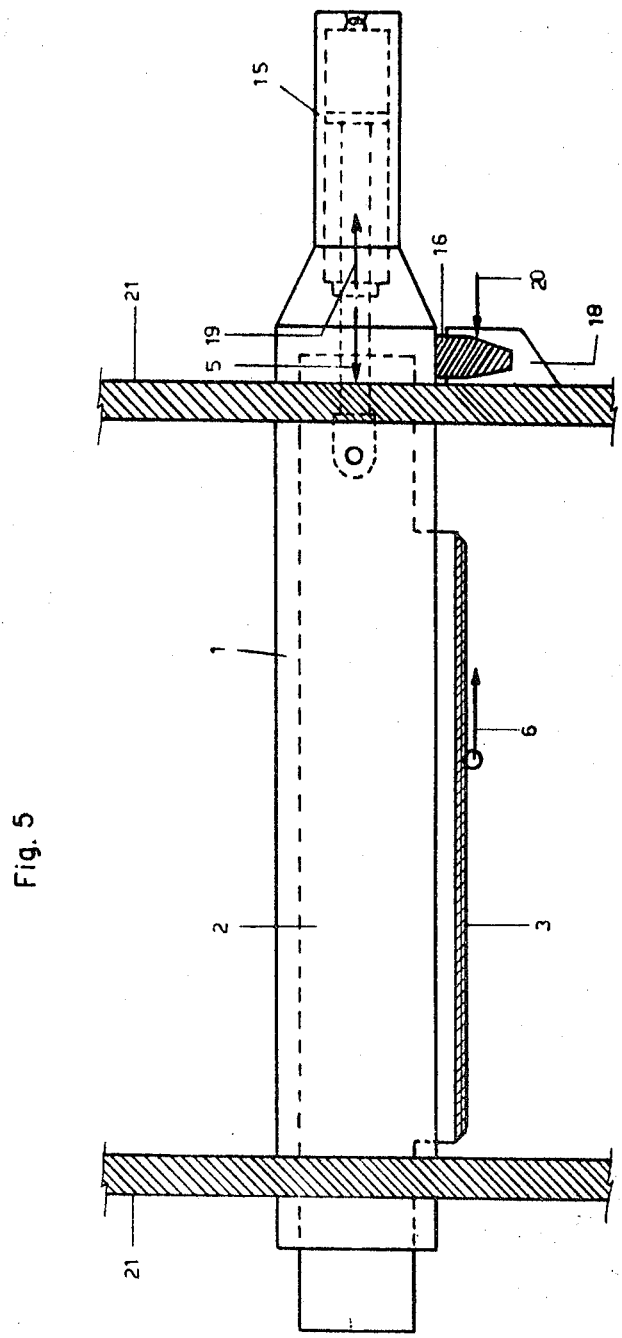
FIGURE 5 is a fragmentary view in front elevation, partly schematic and partly in section, illustrating in greater detail the toothed system shown in FIGURE 1 for compensating the moments produced in the beams by the actuating forces.

To this end, referring particularly to FIGURES 1 and 5, the ends of the guiding body 1 of the upper traverse *a* are provided with two teeth 16 and 17, which fit, when the traverse is lowered for bringing its rubbers 3 into contact with the fringes 4, in suitable housings 18 rigidly secured to the shoulders *c* and *d* of the machine. Further, the outside casing of the oil cylinder 15, driving the beam 2 of the upper traverse *a* is rigidly connected to the guiding body 1 of the traverse so that the oil cylinder is raised and lowered with the traverse member.

As best seen in FIGURE 5, by this means the actuating force 5 acting on the guide body 1 of the upper traverse *a*, due to the fact the former is rigidly connected to the oil cylinder 15 producing the actuating force, determines the reaction force 19 of the guide body 1 on the oil cylinder. Reaction force 19 thus has the same magnitude and action line, but in an opposite direction, as that of force 5. On the other hand, the same driving force 5, acting on the beam 2 of the upper traverse *a*, determines the reaction force 6 exerted by the fringes on the rubbers 3. The reaction force 6 is also balanced by a like opposite force 20 exerted by the rigid part of the machine, represented by the housings 18, on the teeth 16 and 17.

It will thus be seen that the moments produced in the upper traverse by the horizontal actuating force are counter-balanced by creating like and opposite forces, wherefore the uniform distribution of the load exerted by the rubbers on the fringes is not disturbed.

Referring now more particularly to FIGURES 1 and 4, the guide body 1 of the upper traverse member *a* is also provided with two metal plates *h* and *i*, respectively, secured to its ends at the opposite faces thereof and extending below the lower traverse member *b*.

In the space between the two plates *h* and *i*, respectively, pass the supports of the housings 18 secured to the sides of the machine. At the end of each couple of metal plates are hinged, through the bolts *l*, connecting rods 8 and 9, respectively, in turn hinged to the levers 10 and 11. Levers 10 and 11 pass through slots *m* in the sides *c* and *d* of the machine and advantageously extend inside a case *n* rigidly secured to the machine sides. The slots *m* and the case *n* are of sufficient size so as to accommodate the stroke of the upper traverse *a* between its raised and lowered positions.

The levers 10 and 11 are pivotally mounted by means of the bolts 12 and 13, supported by the case *n*, and end with central ends 14 and 14', respectively, having the shape of a fork. The ends of levers 10 and 11 interconnected by the gudgeon pin *o*, whereby rotation of one lever causes a like and opposite rotation of the other lever.

It will be apparent from the foregoing that if, for example, a force tends to lower upper traverse *a* on the side of the connecting rod 8, and consequently to lift the same on the side of the connecting rod 9, the counter-clockwise rotation of the lever 10 around its pivot 12 tends to raise its end 14 and therefore the end 14' of the lever 11, which thereby will rotate clockwise around its pivot. The resulting clockwise rotation of lever 11 lowers the end of the lever 11 hinged to the connecting rod 9, by an amount equal to the distance that rod 8 was previously lowered, thereby maintaining the upper traverse *a* horizontal at all times.

In addition, the provision according to the invention of compressed air piston-cylinder units 25, 26 for lifting and lowering upper traverse *a* is important in permitting positive positioning of the traverse member and, consequently, permitting fine adjustment of the loading of the beam rubbers on the fringes. Furthermore, each of the units 25, 26 is independently operable and each is capable of supporting the traverse *a*, providing a safety device in the event of a failure in one of the cylinders.

It will thus be seen that the beam loading and moment compensating construction of the present invention is able to absorb whatever moment is applied to the beams and to balance the vertical load exactly in the middle of the area of that portion of the beam rubbers engaging the fringes. Thus, there is obtained a uniform distribution of the load exerted by the rubbers on the fringes and therefore a uniform rolling of the fringes, without manual intervention and with minor wear of the rubbers. Also, all the elements of articulation or of reciprocating movement in the system, besides being loaded with low specific loads, are subjected to very reduced and slower movements, further contributing to complete absorption of the moments applied to the beams.

What is claimed is:

1. In a fringe twisting machine, including upper and lower traverse members each carrying horizontally movable beams having opposed rubber surfaces, and wherein said lower traverse member is fixedly mounted to the machine frame and said upper traverse member is vertically movable from an upper to a lower position whereat said opposed rubber surfaces are adapted to receive therebetween under pressure a series of fringes which extend across the width of a cloth carried by said machine and said beams are adapted to be moved in opposite horizontal directions so as to twist said series of fringes, the improvement therein which comprises: means for preventing relative vertical movement between said traverse members when said upper traverse member is located in said lower position, whereby the force couples produced upon actuating said movable beams in said opposite horizontal directions are counterbalanced and said series of fringes is thereby uniformly twisted.

2. A fringe twisting machine as claimed in claim 1, wherein said upper beam is actuated for movement in said horizontal direction by means rigidly mounted to the vertically movable upper traverse member.

3. In a fringe twisting machine, including upper and lower traverse members each carrying horizontally movable beams having opposed rubber surfaces, and wherein said lower traverse member is fixedly mounted to the machine frame and said upper traverse member is vertically movable from an upper to a lower position whereat said opposed rubber surfaces are adapted to receive therebetween under pressure a series of fringes which extend across the width of a cloth carried by said machine and said beams are adapted to be moved in opposite horizontal directions so as to twist said series of fringes, the improvement therein which comprises: means mounting said upper traverse member to a piston-cylinder unit at each end thereof and means connecting each of said piston-cylinder units to an independent source of fluid pressure, each of said sources of fluid pressure capable of supporting said traverse member alone.

4. A fringe twisting machine as claimed in claim 3, including a pair of generally horizontal, pivotally mounted lever members hingedly connected together at their inner ends and hingedly connected at their respective outer ends to the piston rod of each of said piston-cylinder units, and wherein said means mounting said upper traverse member to each of said piston-cylinder units includes a connecting rod member pivotally mounted between each of said levers and said upper traverse member, whereby rotation of one of said lever members in a first direction causes rotation of the other of said lever members in a direction opposite to said first direction, thereby maintaining said upper traverse member parallel to said lower traverse member.

References Cited

UNITED STATES PATENTS

| 6,911 | 11/1849 | Whipple | 57—77.4 |
| 95,145 | 9/1869 | Ruth | 57—1 XR |
| 114,562 | 5/1871 | Howard | 57—1 |
| 147,550 | 2/1874 | Brooks | 57—77.4 |
| 182,590 | 9/1876 | Mortimer | 57—77.4 |
| 567,590 | 9/1896 | Gledhill | 57—1 |
| 2,601,394 | 6/1952 | Hansen | 57—77.4 XR |
| 2,712,213 | 7/1955 | MacDonald | 57—1 |

JOHN PETRAKES, Primary Examiner

U.S. Cl. X.R.

57—77